United States Patent [19]

Bailey et al.

[11] Patent Number: 4,457,573

[45] Date of Patent: Jul. 3, 1984

[54] TERMINAL-BUSHING ASSEMBLY

[75] Inventors: Charles H. Bailey, Readsboro, Vt.; Richard E. Cote, North Adams, Mass.

[73] Assignee: Sprague Electric Company, North Adams, Mass.

[21] Appl. No.: 386,547

[22] Filed: Jun. 9, 1982

[51] Int. Cl.³ .............................................. H02B 1/02

[52] U.S. Cl. ................................ 339/128; 339/275 R; 339/218 R

[58] Field of Search ............ 339/126 R, 126 RS, 128, 339/218 R, 218 M, 275 R; 174/142, 153 R

[56] References Cited

U.S. PATENT DOCUMENTS

| | | | |
|---|---|---|---|
| Re. 28,119 | 8/1974 | Busler et al. | 29/625 |
| 3,079,581 | 2/1963 | Klumpp, Jr. | 339/128 |
| 3,273,104 | 9/1966 | Krol | 339/128 |
| 3,708,612 | 1/1973 | Saxon et al. | 339/218 R X |
| 3,866,095 | 2/1975 | Marmorek | 317/230 |
| 4,114,976 | 9/1978 | Selvin et al. | 339/218 M X |
| 4,241,976 | 12/1980 | Oliver et al. | 339/218 R X |

OTHER PUBLICATIONS

Don J. Kolb, "Designing Plastic Parts for Ultrasonic Assembly", *Machine Design,* 3/16/67.

*Primary Examiner*—John McQuade
*Assistant Examiner*—Steven C. Bishop

[57] ABSTRACT

A plastic bushing has an axially running rectangular tapered hole. A metal terminal strip has a central portion with barbed edges. The thickness of the strip is less than the narrow dimension of the bushing hole while the width of the central strip portion is greater than the widest dimension of the bushing hole. The strip is pressed into the hole while ultrasonic energy is applied, to embed the barbed strip edges in opposite of the bushing walls. The bushing structure includes snap-in mounting means. This two piece terminal-bushing assembly provides a strong low cost unit that is simple to mount and connect to.

10 Claims, 5 Drawing Figures

TERMINAL-BUSHING ASSEMBLY

BACKGROUND OF THE INVENTION

This invention relates to a terminal-bushing assembly that is mountable in the housing wall of an electrical component, and more particularly relates to a metal terminal strip with barbed edges that are ultrasonically embedded in opposite walls of a plastic bushing hole.

A favorite method used for many years for making a low cost terminal-bushing includes the assembly of two plastic washers over the inside and outside facets of a hole in a component-housing wall, there being two smaller diameter holes in the two washers, respectively, that are mutually aligned. A metal terminal strip is placed on the outer washer, the metal strip also having a small hole aligned with the washer holes. A rivet is then threaded through the strip and washer holes and is then crimped to form a rigid terminal-bushing-housing assembly. However, the handling, alignment, holding and crimping operations are not readily automatable and a large amount of operator attention is typically employed.

It is also known to make metal terminal strips with springy fingers cut and raised from the major-strip surfaces. These fingers serve as spring loaded barbs that may be pushed into a hole in a plastic member and would resist retraction due to the barbs pressing the walls of the hole. Another method for holding and sealing terminal strips in a plastic header includes threading a component-ribbon lead through a hole in the plastic header from the inside to the outside, pushing a terminal strip part-way into the same hole along side the ribbon lead and applying ultrasonic energy between the terminal strip and the header to seal the ribbon-lead and terminal strip in the header. Such a method is described by Marmorek in his patent U.S. Pat. No. 3,866,095 issued July 13, 1973 and assigned to the same assignee as is the present invention. The header-terminal of Marmorek is intended for use in a wet electrolytic capacitor package that must be hermetically sealed. However the threading of a ribbon lead represents an assembly operator problem that is inappropriately costly for a terminal header assembly for which there is no sealing requirement.

It is therefore an object of this invention to provide a low cost terminal-bushing assembly that is easily automatable and employs only two parts, a terminal strip and a bushing.

It is a further object of this invention to provide such a terminal-bushing assembly that includes a mounting means for mounting in a component housing.

It is a further object of this invention to provide such a terminal-bushing assembly that when mounted provides a high resistance to forces between the terminal and housing of pulling as well as of twisting.

SUMMARY OF THE INVENTION

A terminal-bushing assembly includes a molded plastic bushing having an outer end and an inner end that are substantially perpendicular to the axis of the bushing. The bushing includes a mounting means for mounting the bushing in a hole in a wall of an electrical component housing. A flat-metal-terminal strip has a terminal formed at one end of the strip and preferably a spade terminal for connection by a universal push-on-type electrical connector. The terminal strip also has a uniformly thick central portion that is tapered in an axial direction away from the spade terminal. The tapered edges of said central portion have a saw tooth profile. At the other end of the strip it is convenient to provide an inward terminal portion extending from the bushing to which the electrical component may be connected by soldering or welding.

The central tapered and toothed portion of the terminal strip is located in a hole running axially through the plastic bushing. The saw-toothed edges are embedded in opposite wall portions of the hole. The periphery of the hole at the outer end is preferably beveled to aid in assembly. The walls of the hole are tapered inwardly and at least one of the major faces of the central strip portion is for the most part spaced from an adjacent wall portion of the hole.

Many of the above features are either for making an ultrasonic-assembly method less critical (e.g. bevels and tapers) or in some cases possible at all, or are a direct result of the ultrasonic process itself (e.g. selective embedment of saw toothed strip portion to only the end walls of the bushing hole).

The method of this invention comprises simultaneously inserting the central portion of the metal strip into the tapered-bushing hole at the larger outer end while applying ultrasonic energy between the strip and bushing to embed the strip edges in the opposite walls of the hole. The broad faces of the strip having a smaller dimension than the spacing in the bushing hole between major wall surfaces, dissipate essentially no ultrasonic energy. As a result, the energy is substantially all concentrated at the pair of minor wall surfaces that are thereby locally melted to embed the saw toothed edges of the strip.

The tapered hole and tapered and toothed central portion of the strip provides easier and less critical alignment at insertion. It also insures a more uniform embedment of the teeth in the wall since the interference fit of the strip with the wall is progressively more severe as the strip is inserted. Initial insertion is aided by the hole bevel. The metal terminal itself is extremely simple; it may simply be punch-cut from sheet stock. The bushing, including complete mounting means, is of a thermoplastic that can be molded in automatic injection-mold presses at low cost. The invention and ultrasonic welding steps also represent a very simple assembly process that is readily automatable. However, one of the most significant and surprising features of this structure realized during its manufacture, is that the selective heating by ultrasonic energy of the saw tooth edges leaves the bulk of the metal strip unheated so that after the ultrasonic energy is turned off, cooling and resolidification of the reflowed plastic is very fast making for high speed production.

DESCRIPTION OF THE PREFERRED EMBODIMENTS

Figure 1:
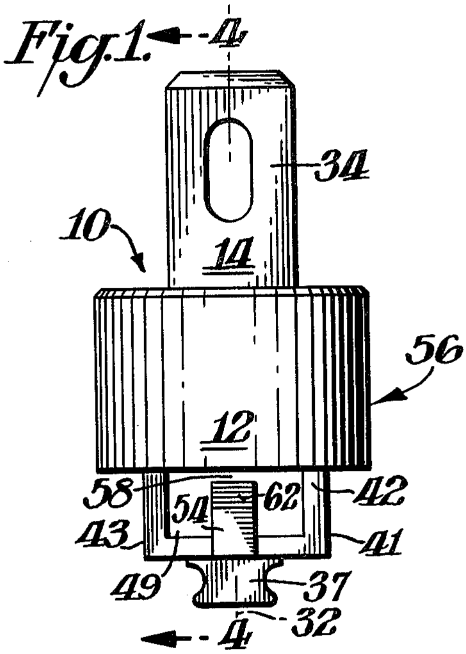
FIG. 1 shows a face view of the terminal-bushing assembly of this invention.

The terminal-bushing assembly 10 shown in FIGS. 1 through 5 consists of an injection molded thermoplastic bushing 12 and a metal strip 14. The metal strip 14 has been cut from a brass sheet and has no protrusions from its major surfaces as is clearly seen in FIG. 4. Thus, although it is beveled at a top edge 16, the strip 14 has major surfaces 18 and 20 that are uninteruptedly flat. This feature, as will be understood from the description of the method for assembly that follows, makes it possible to assemble the terminal easily in the bushing hole 22 having a narrow width for axial registration therein.

Figure 3:
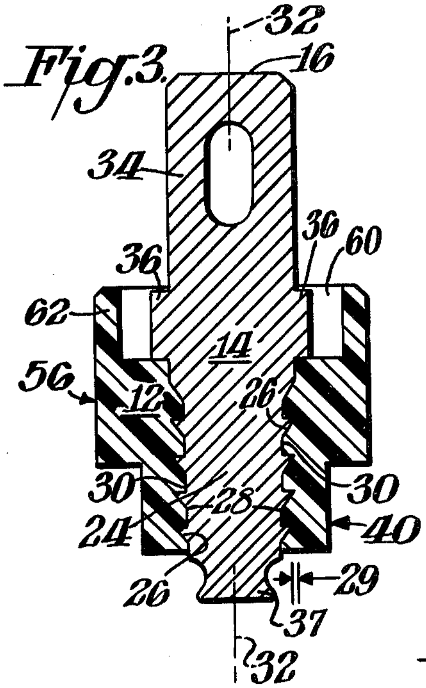
FIG. 3 shows a face-sectional view of the terminal-bushing assembly of FIG. 2 taken in plane 3—3.
Figure 4:
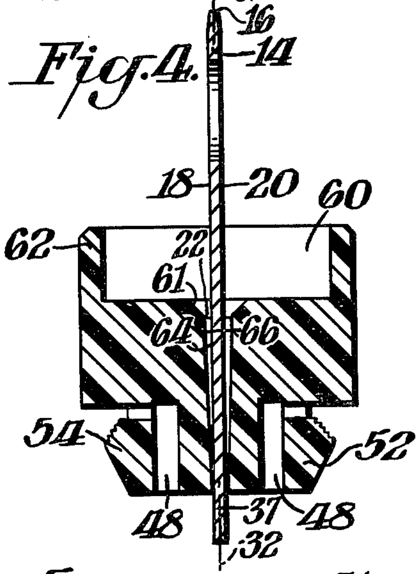
FIG. 4 shows a side-sectional view of the assembly of FIG. 1 taken in plane 4—4.

With particular reference to FIG. 3, the central portion 24 of strip 14 is provided with a series of lateral barbs 26 formed along the two edges 28 of strip 14. These barbs 26 appear as saw teeth and are embedded in the two opposing narrow walls 30 of hole 22. The hole edges 30 are tapered in an axial direction toward the bottom (as shown) of the bushing 12. The barbed metal-strip edges 28 are also tapered in the same direction by about the same amount, namely each edge has about a 1 degree taper (e.g. 29) with respect to the axis 32. These tapers facilitate assembly of the strip 14 into the bushing hole 22 and provide a more uniform embedment of the barbs 26 from top to bottom.

At the upper portion of the strip 14 a universal-type spade terminal 34 is formed, intended for connection by a push-on type connector (not shown) that has been widely used in electrical apparatus for several decades. The terminal 34 has two laterally extending stop portions 36 that are for stopping the above noted connector from being pushed on too far. These stop portions 36 do not necessarily seal against the plastic bushing to control the limit of insertion of strip 14 in hole 22, since that function may be provided by other stop means in the assembly-holding or pressing fixture (not shown).

A bottom portion 37 of strip 14 extends from the other end of hole 22 to which an electrical connection may be made to an electrical component 38 by soldering or welding.

Figure 2:
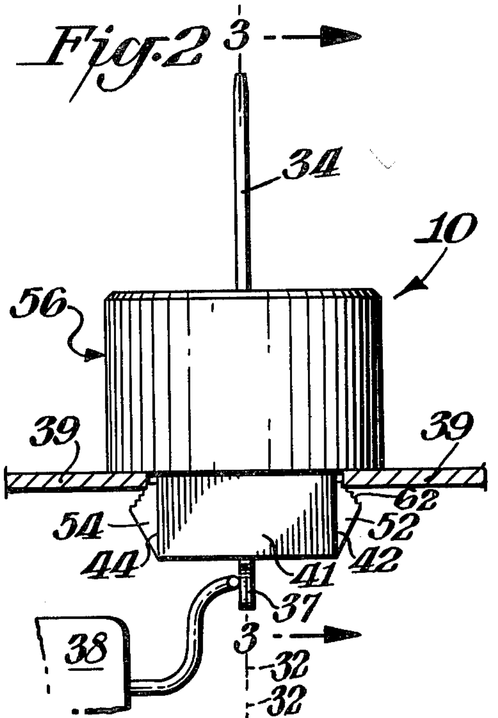
FIG. 2 shows a side view of the assembly, taken at right angles to the face view of FIG. 1, being mounted in a hole in the wall of an electrical component housing.

The plastic bushing 12 is designed for mounting in a hole, in this embodiment a square hole in a component housing 39, a portion of which is shown in FIG. 2. The housing 39 may be a metal can for protection of the electrical component 38. The square, or more generally the rectangular hole, provides a strong resistance against torquing forces that may be exerted between the terminal-assembly 10 and the housing 39.

Figure 5:
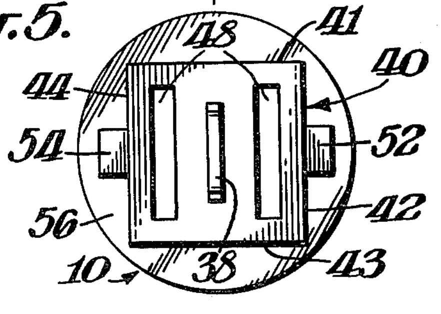
FIG. 5 shows an inner-end view of the terminal-bushing assembly of FIG. 2.

With particular reference to FIG. 5, the bottom portion 40 of the bushing has a square profile and from FIGS. 1 and 2, the bushing-bottom portion 40 is seen to have four substantially flat sides 41, 42, 43 and 44. Slots, e.g. 48 and 49 define a pair of plastic fingers 52 and 54, in sides 42 and 44, that extend slightly laterally but mainly upward and axially. A flange portion 56 of the bushing 12 extends laterally beyond the perimeter of the bushing bottom portion 40. The plastic fingers 52 and 54 are spaced away from the flange portion 56 by a space 58 slightly less than the thickness of the housing 39 in which the bushing 12 is to be mounted. Corrugations at the tip of the fingers lock the finger tips to the edge of that housing hole, after the terminal assembly 10 is seated there. Further, a wide range of housing wall thicknesses is effectively accommodated by these corrugated fingers 52 and 54.

In the top or flange portion 56 of the bushing 12 there is a well 60 that forms a cylindrical rim 62. In this way, the distance along the flange portion surface between the terminal strip 14 and a metal housing 39 by which path surface leakage currents are prone to flow and/or voltage breakdown tends to occur, is substantially lengthened.

The outer end of hole 22 has a bevel 61 at its perimeter to further simplify insertion of strip 14.

The method of assembly of the metal strip 14 in the bushing 12 consists of pressing the tapered and saw-toothed central strip portion 24 into the tapered hole 22 while simultaneously applying ultrasonic energy to the strip 14. The width between the tapered walls 30 of hole 22 is less than that of the central portion of the metal strip 14 and the ultrasonic energy has momentarily caused those walls 30 to become hot and fluid. When the strip 14 is properly inserted and the ultrasonic energy turned off, the displaced walls 30 cool and resolidify embedding the saw toothed edges 28 of strip 14.

This highly selective heating at the saw toothed edges 28 occurs while the remainder of the central strip portion 24 experiences no significant temperature rise. Besides the obvious energy conservation feature this provides, it also leads to a quick cooling and resolidification of the plastic walls 30 after the ultrasonic heating ceases since the heat is readily dissipated by the cool unheated body of the central metal 24. Experiments have shown that terminal-bushing assemblies 10 of this invention can be assembled at a rate at least as great as 40 pieces per minute in a sequential in-line machine operating altogether automatically.

The width between the two major faces, e.g. 64, of the central strip portion 24 is not as great, at least for the most part, as is the width between the major wall faces, e.g. 66, of hole 22, that is similarly tapered toward the bottom. Thus there is essentially no bonding of major strip faces, e.g. 64, to adjacent major hole wall faces 66. This leads to the highly selective ultrasonic heating and reflowing of the hole walls 30 and a selective embedment and bonding in the hole 22 of the saw toothed strip edges 28 only. Not only does this direct the ultrasonic energy to the most lateral dimensions of the metal strip where bonding to resist rocking, twisting, pushing and pulling is the most effective, but the aligning of the strip with the hole for insertion and insertion itself become less critical. Automatic handling, insertion and welding are thus made simple and relatively inexpensive.

A quantity of prototype terminal-bushings were made wherein the brass strip 14 is 0.030 inch thick and 0.875 inch high. The bushing 12 is fiberglass filled nylon that has pronounced thermoplastic properties and that was injection molded. The bushing flange 56 has a diameter of 0.5 inch and an axial length of 0.3 inch while the box portion 40 has a length of 0.15 inch and the square bottom as seen in FIG. 5 is 0.32 inch on a side. The fit between the saw toothed-metal edges 28 and the side walls 30 is in interference by about 0.015 inch. The narrow dimension of the hole 22 is originally about equal to the thickness of the strip 14 at the bottom but at the top there is a clearance of about 0.004 inch.

These mounted terminal-bushings are capable of surviving a 25 pound pull between the strip 14 and the component housing 39, without damage or permanent distortion.

What is claimed is:

1. A terminal-bushing assembly comprising a metal-terminal strip; and a molded-plastic bushing having a main axis at right angles to an inner end and an outer end thereof and having a mounting means for mounting said bushing in a hole in a wall of an electrical-component housing with said axis perpendicular to said housing wall, said terminal strip having a spade terminal formed at an outer end thereof for connection by a universal push-on-type electrical connector, said strip having a unifomly thick central portion that is tapered in an axial direction, the tapered edes of said central portion having a saw.tooth profile, and said strip having an inward-terminal portion to which said electrical component may be connected, said central tapered and toothed portion of said terminal strip is located in a hole running axially through said bushing, said saw-toothed edges being embedded in opposite wall portions of said hole, the space between the major wall surfaces of said bushing hole being greater than the thickness of said metal strip so that at least one of the major strip faces is for the most part spaced from the adjacent of said major wall surfaces.

2. The terminal-bushing assembly of claim 1 wherein said major wall surfaces of said hole are tapered in said axial direction.

3. The terminal-bushing assembly of claim 1 wherein the bond between said terminal strip and said plastic bushing is essentially confined to the embedded teeth region.

4. The terminal-bushing assembly of claim 1 wherein said metal strip is of uniform thickness and the two major surfaces of said central portion are uninterruptedly flat.

5. The terminal-bushing assembly of claim 1 wherein the periphery of said bushing hole at the outer end thereof is beveled.

6. The terminal-bushing assembly of claim 1 wherein said mounting means is comprised of a rectangular box portion formed at said inner bushing end, and a flange formed at said outer bushing end, four sides of said box being parallel to said axis, two opposite of said sides containing slots defining oppositely disposed flexible fingers extending slightly outward of said two sides and mainly axially toward said flange portion and spaced from said flange portion to effect self locking when said bushing is inserted into said hole in said housing.

7. The terminal-bushing of claim 1 wherein the flange-adjacent end of said bushing contains a well portion that is symmetrical with said axis and said terminal strip, to provide a larger bushing surface path for leakage currents between said housing and said terminal strip.

8. A terminal-bushing assembly mountable in a rectangular hole in a metal can that houses an electrical component comprising:

a molded plastic bushing having a mounting-flange portion perpendicular to a bushing axis, and four sides forming a rectangular box portion, two opposite of said sides containing slots defining oppositely disposed flexible fingers extending slightly outward of said sides and mainly axially toward said flange portion and spaced from said flange portion to effect self locking when said bushing is inserted into said rectangular hole in said can, and a terminal strip having been cut from a metal sheet, a spade terminal being formed at one end of said strip, a uniformly thick central portion of said strip being tapered in an axial direction away from said spade terminal and the tapered edges of said central portion having a saw tooth profile, said central tapered and toothed portion of said terminal strip being in a hole running axially through said bushing, said saw-toothed edges being ultrasonically embedded in opposite surface portions of said hole, the periphery of said hole at the end corresponding to said flange portion being beveled, at least one of the major faces of said central strip portion being spaced from an adjacent surface portion of said hole.

9. The terminal bushing of claim 8 wherein the major hole-surface portions adjacent the two opposite of said major faces of said central strip portion are non-parallel and tapered away from said flange end, there being a greater spacing between said at least one major face of said strip and said adjacent hole-surface at said flange portion than away from it.

10. The terminal-bushing assembly of claim 8 wherein the other end of said metal strip extends beyond said bushing to provide another terminal to which said electrical component may be connected.

* * * * *